(12) United States Patent
Wallach et al.

(10) Patent No.: US 9,710,384 B2
(45) Date of Patent: Jul. 18, 2017

(54) MICROPROCESSOR ARCHITECTURE HAVING ALTERNATIVE MEMORY ACCESS PATHS

(75) Inventors: Steven J. Wallach, Dallas, TX (US); Tony Brewer, Plano, TX (US)

(73) Assignee: Micron Technology, Inc., Boise, ID (US)

(*) Notice: Subject to any disclaimer, the term of this patent is extended or adjusted under 35 U.S.C. 154(b) by 1577 days.

(21) Appl. No.: 11/969,792

(22) Filed: Jan. 4, 2008

(65) Prior Publication Data
US 2009/0177843 A1 Jul. 9, 2009

(51) Int. Cl.
G06F 12/00 (2006.01)
G06F 13/00 (2006.01)
G06F 13/28 (2006.01)
G06F 12/0844 (2016.01)
G06F 12/1027 (2016.01)

(52) U.S. Cl.
CPC ...... G06F 12/0844 (2013.01); G06F 12/1027 (2013.01)

(58) Field of Classification Search
CPC ... G06F 9/30145; G06F 9/3851; G06F 9/3885
USPC ........................................................ 711/131
See application file for complete search history.

(56) References Cited

U.S. PATENT DOCUMENTS

| | | | |
|---|---|---|---|
| 3,434,114 A | 3/1969 | Arulpragasam et al. | |
| 4,128,880 A | 12/1978 | Cray, Jr. | |
| 4,386,399 A * | 5/1983 | Rasala et al. | 710/307 |
| 4,685,076 A | 8/1987 | Yoshida et al. | |
| 4,817,140 A | 3/1989 | Chandra et al. | |
| 4,897,783 A * | 1/1990 | Nay | 711/144 |
| 5,027,272 A | 6/1991 | Samuels | |
| 5,109,499 A | 4/1992 | Inagami et al. | |
| 5,117,487 A | 5/1992 | Nagata | |

(Continued)

FOREIGN PATENT DOCUMENTS

WO WO-2008/014494 1/2008

OTHER PUBLICATIONS

International Search Report and Written Opinion issued for PCT/US09/60811, dated Dec. 1, 2009, 7 pgs.

(Continued)

*Primary Examiner* — Sheng-Jen Tsai
(74) *Attorney, Agent, or Firm* — Norton Rose Fulbright US LLP

(57) ABSTRACT

The present invention is directed to a system and method which employ two memory access paths: 1) a cache-access path in which block data is fetched from main memory for loading to a cache, and 2) a direct-access path in which individually-addressed data is fetched from main memory. The system may comprise one or more processor cores that utilize the cache-access path for accessing data. The system may further comprise at least one heterogeneous functional unit that is operable to utilize the direct-access path for accessing data. In certain embodiments, the one or more processor cores, cache, and the at least one heterogeneous functional unit may be included on a common semiconductor die (e.g., as part of an integrated circuit). Embodiments of the present invention enable improved system performance by selectively employing the cache-access path for certain instructions while selectively employing the direct-access path for other instructions.

55 Claims, 4 Drawing Sheets

(56) References Cited

U.S. PATENT DOCUMENTS

| | | | |
|---|---|---|---|
| 5,202,969 | A * | 4/1993 | Sato et al. ............... 711/143 |
| 5,222,224 | A * | 6/1993 | Flynn et al. ............... 711/144 |
| 5,283,886 | A * | 2/1994 | Nishii et al. ............... 711/144 |
| 5,513,366 | A | 4/1996 | Agarwal et al. |
| 5,598,546 | A | 1/1997 | Blomgren |
| 5,664,136 | A | 9/1997 | Witt et al. |
| 5,752,035 | A | 5/1998 | Trimberger |
| 5,838,984 | A | 11/1998 | Nguyen et al. |
| 5,887,182 | A | 3/1999 | Kinoshita et al. |
| 5,887,183 | A | 3/1999 | Agarwal et al. |
| 5,920,721 | A | 7/1999 | Hunter et al. |
| 5,933,627 | A | 8/1999 | Parady |
| 5,935,204 | A * | 8/1999 | Shimizu et al. ............ 709/212 |
| 5,937,192 | A | 8/1999 | Martin |
| 5,941,938 | A | 8/1999 | Thayer |
| 5,999,734 | A | 12/1999 | Willis et al. |
| 6,006,319 | A | 12/1999 | Takahashi et al. |
| 6,023,755 | A | 2/2000 | Casselman |
| 6,026,479 | A | 2/2000 | Fisher et al. |
| 6,075,546 | A | 6/2000 | Hussain et al. |
| 6,076,139 | A | 6/2000 | Welker et al. |
| 6,076,152 | A | 6/2000 | Huppenthal et al. |
| 6,097,402 | A | 8/2000 | Case et al. |
| 6,098,169 | A | 8/2000 | Ranganathan |
| 6,125,421 | A | 9/2000 | Roy |
| 6,154,419 | A | 11/2000 | Shakkarwar |
| 6,170,001 | B1 | 1/2001 | Hinds et al. |
| 6,175,915 | B1 | 1/2001 | Cashman et al. |
| 6,195,676 | B1 | 2/2001 | Spix et al. |
| 6,202,133 | B1 | 3/2001 | Jeddeloh |
| 6,209,067 | B1 * | 3/2001 | Collins et al. ............... 711/158 |
| 6,212,544 | B1 | 4/2001 | Borkenhagen et al. |
| 6,240,508 | B1 | 5/2001 | Brown, III et al. |
| 6,308,255 | B1 * | 10/2001 | Gorishek et al. ............ 712/209 |
| 6,308,323 | B1 | 10/2001 | Douniwa |
| 6,339,813 | B1 | 1/2002 | Smith, III et al. |
| 6,342,892 | B1 * | 1/2002 | Van Hook et al. ......... 345/503 |
| 6,345,384 | B1 | 2/2002 | Sato |
| 6,434,687 | B1 | 8/2002 | Huppenthal |
| 6,473,777 | B1 * | 10/2002 | Hendler et al. |
| 6,473,831 | B1 | 10/2002 | Schade |
| 6,480,952 | B2 * | 11/2002 | Gorishek et al. ............ 712/227 |
| 6,567,900 | B1 | 5/2003 | Kessler |
| 6,611,908 | B2 | 8/2003 | Lentz et al. |
| 6,665,790 | B1 | 12/2003 | Glossner, III et al. |
| 6,684,305 | B1 | 1/2004 | Deneau |
| 6,701,424 | B1 | 3/2004 | Liao et al. |
| 6,738,967 | B1 | 5/2004 | Radigan |
| 6,789,167 | B2 * | 9/2004 | Naffziger ................... 711/118 |
| 6,831,979 | B2 | 12/2004 | Callum |
| 6,839,828 | B2 | 1/2005 | Gschwind et al. |
| 6,868,472 | B1 * | 3/2005 | Miyake et al. ............... 711/3 |
| 6,891,543 | B2 | 5/2005 | Wyatt |
| 6,948,158 | B2 | 9/2005 | Van Gageldonk et al. |
| 6,954,845 | B2 | 10/2005 | Arnold et al. |
| 6,978,451 | B2 | 12/2005 | Heeb |
| 6,983,456 | B2 | 1/2006 | Poznanovic et al. |
| 7,000,211 | B2 | 2/2006 | Arnold |
| 7,028,286 | B2 | 4/2006 | Larin et al. |
| 7,065,631 | B2 | 6/2006 | Weaver |
| 7,120,755 | B2 | 10/2006 | Jamil et al. |
| 7,149,867 | B2 | 12/2006 | Poznanovic et al. |
| 7,167,971 | B2 | 1/2007 | Asaad et al. |
| 7,225,324 | B2 | 5/2007 | Huppenthal et al. |
| 7,228,531 | B1 | 6/2007 | Langhammer |
| 7,237,088 | B2 | 6/2007 | Barry et al. |
| 7,257,757 | B2 | 8/2007 | Chun et al. |
| 7,278,122 | B2 | 10/2007 | Willis |
| 7,313,673 | B2 | 12/2007 | Abernathy et al. |
| 7,328,195 | B2 | 2/2008 | Willis |
| 7,367,021 | B2 | 4/2008 | Ansari et al. |
| 7,376,812 | B1 | 5/2008 | Sanghavi et al. |
| 7,418,571 | B2 | 8/2008 | Wolrich et al. |
| 7,421,565 | B1 | 9/2008 | Kohn |
| 7,506,325 | B2 | 3/2009 | Brokenshire et al. |
| 7,543,282 | B2 | 6/2009 | Chou |
| 7,546,441 | B1 | 6/2009 | Ansari et al. |
| 7,577,822 | B2 | 8/2009 | Vorbach |
| 7,643,353 | B1 | 1/2010 | Srinivasan et al. |
| 7,665,078 | B2 | 2/2010 | Liebenow |
| 7,886,129 | B2 * | 2/2011 | Hudepohl et al. ............ 712/34 |
| 7,895,585 | B2 | 2/2011 | Prakash et al. |
| 7,904,703 | B1 | 3/2011 | Kang et al. |
| 8,020,169 | B2 | 9/2011 | Yamasaki |
| 8,095,735 | B2 * | 1/2012 | Brewer et al. ............... 711/127 |
| 8,095,778 | B1 | 1/2012 | Golla |
| 8,122,229 | B2 * | 2/2012 | Wallach et al. ............... 712/34 |
| 8,136,102 | B2 | 3/2012 | Papakipos et al. |
| 8,156,307 | B2 * | 4/2012 | Wallach et al. ............... 711/203 |
| 8,196,127 | B2 | 6/2012 | Gschwind |
| 8,327,325 | B2 | 12/2012 | Chung et al. |
| 8,458,629 | B2 | 6/2013 | Caldwell et al. |
| 8,484,588 | B2 | 7/2013 | Ng et al. |
| 8,972,958 | B1 | 3/2015 | Brewer |
| 9,069,553 | B2 | 6/2015 | Zaarur et al. |
| 2001/0011342 | A1 | 8/2001 | Pechanek et al. |
| 2001/0049816 | A1 | 12/2001 | Rupp |
| 2002/0013892 | A1 * | 1/2002 | Gorishek et al. ............ 712/227 |
| 2002/0046324 | A1 | 4/2002 | Barroso et al. |
| 2002/0100029 | A1 | 7/2002 | Bowen |
| 2003/0005424 | A1 | 1/2003 | Ansari et al. |
| 2003/0046521 | A1 | 3/2003 | Shoemaker |
| 2003/0140222 | A1 | 7/2003 | Ohmi et al. |
| 2003/0226018 | A1 | 12/2003 | Tardo et al. |
| 2004/0003170 | A1 | 1/2004 | Gibson et al. |
| 2004/0088524 | A1 * | 5/2004 | Chauvel et al. ............ 712/205 |
| 2004/0107331 | A1 | 6/2004 | Baxter |
| 2004/0117599 | A1 | 6/2004 | Mittal et al. |
| 2004/0193837 | A1 | 9/2004 | Devaney et al. |
| 2004/0193852 | A1 | 9/2004 | Johnson |
| 2004/0194048 | A1 | 9/2004 | Arnold |
| 2004/0215898 | A1 | 10/2004 | Arimilli et al. |
| 2004/0221127 | A1 | 11/2004 | Ang |
| 2004/0236920 | A1 * | 11/2004 | Sheaffer ................... 711/165 |
| 2004/0243984 | A1 | 12/2004 | Vorbach et al. |
| 2004/0250046 | A1 | 12/2004 | Gonzalez et al. |
| 2005/0027970 | A1 | 2/2005 | Arnold et al. |
| 2005/0044539 | A1 | 2/2005 | Liebenow |
| 2005/0108503 | A1 | 5/2005 | Sandon et al. |
| 2005/0125754 | A1 | 6/2005 | Schubert et al. |
| 2005/0149931 | A1 | 7/2005 | Lin et al. |
| 2005/0172099 | A1 | 8/2005 | Lowe |
| 2005/0188368 | A1 | 8/2005 | Kinney |
| 2005/0193359 | A1 | 9/2005 | Gupta et al. |
| 2005/0223369 | A1 | 10/2005 | Chun et al. |
| 2005/0262278 | A1 | 11/2005 | Schmidt |
| 2006/0075060 | A1 | 4/2006 | Clark |
| 2006/0095901 | A1 | 5/2006 | Brokenshire et al. |
| 2006/0149941 | A1 | 7/2006 | Colavin et al. |
| 2006/0259737 | A1 | 11/2006 | Sachs et al. |
| 2006/0288191 | A1 | 12/2006 | Asaad et al. |
| 2007/0005881 | A1 | 1/2007 | Garney |
| 2007/0005932 | A1 | 1/2007 | Covelli et al. |
| 2007/0038843 | A1 | 2/2007 | Trivedi et al. |
| 2007/0106833 | A1 | 5/2007 | Rankin et al. |
| 2007/0130445 | A1 | 6/2007 | Lau et al. |
| 2007/0153907 | A1 | 7/2007 | Mehta et al. |
| 2007/0157166 | A1 | 7/2007 | Stevens |
| 2007/0186210 | A1 | 8/2007 | Hussain et al. |
| 2007/0226424 | A1 * | 9/2007 | Clark et al. ................... 711/141 |
| 2007/0245097 | A1 | 10/2007 | Gschwind et al. |
| 2007/0283336 | A1 | 12/2007 | Gschwind et al. |
| 2007/0288701 | A1 | 12/2007 | Hofstee et al. |
| 2007/0294666 | A1 | 12/2007 | Papakipos et al. |
| 2008/0059758 | A1 | 3/2008 | Sachs |
| 2008/0059759 | A1 | 3/2008 | Sachs |
| 2008/0059760 | A1 | 3/2008 | Sachs |
| 2008/0104365 | A1 | 5/2008 | Kohno et al. |
| 2008/0115113 | A1 | 5/2008 | Codrescu et al. |
| 2008/0177996 | A1 | 7/2008 | Simar et al. |
| 2008/0209127 | A1 * | 8/2008 | Brokenshire et al. ........ 711/125 |
| 2008/0215854 | A1 * | 9/2008 | Asaad et al. ................. 712/214 |
| 2009/0064095 | A1 * | 3/2009 | Wallach et al. ............... 717/106 |
| 2009/0144690 | A1 | 6/2009 | Spackman et al. |

(56) References Cited

U.S. PATENT DOCUMENTS

| | | |
|---|---|---|
| 2009/0172364 A1 | 7/2009 | Sprangle et al. |
| 2009/0219779 A1 | 9/2009 | Mao et al. |
| 2010/0002572 A1 | 1/2010 | Garrett |
| 2010/0036997 A1 | 2/2010 | Brewer et al. |
| 2010/0070516 A1 | 3/2010 | Adler |
| 2010/0138587 A1 | 6/2010 | Hutson |
| 2011/0055516 A1 | 3/2011 | Willis |
| 2011/0276787 A1 | 11/2011 | Koga et al. |
| 2012/0036514 A1 | 2/2012 | Master et al. |
| 2012/0042121 A1 | 2/2012 | Kim et al. |
| 2012/0131309 A1 | 5/2012 | Johnson et al. |
| 2012/0192163 A1 | 7/2012 | Glendenning et al. |

OTHER PUBLICATIONS

International Search Report and Written Opinion issued for PCT/US09/60820, dated Dec. 9, 2009, 8 pgs.
International Search Report and Written Opinion issued for PCT/US08/87233, dated Feb. 5, 2009, 11 pgs.
The PC Guide, "The PC's x86 Instruction Set", 2004, www.pcguide.com/ref/cup.arch/int/instX86-c.html, 3 pgs.
Andreas Koch et al., "A Universal Co-Processor for Workstations", 1994, Abingdon EE&CS Books, 14 pgs.
Siewiorek, Daniel P.; Bell, Gordon C.; Newell, Allen; "Computer Structures: Principles and Examples" McGraw-Hill, 1982, p. 334, Figure 1(a).
Cray XD1™ FPGA Development, Release 1.2; S-6400-12, issued Apr. 18, 2005. Available at www.eng.uah.edu/~jacksoa/CrayXD1FPGADevelopment.pdf.
Callahan, Timothy J.; Hauser, John R.; Wawrzynek, John; "The Garp Architecture and C Compiler", IEEE Computer, vol. 33, No. 4, pp. 62-69, Apr. 2000.
Poster entitled GigaScale Mixed-Signal System Verification, FTL Systems, Inc. presented at the DARPA/MTO Team/NeoCAD2003 Fall Review, Sep. 15-17, 2003, Monterey, CA, a public unclassified meeting.
Poster entitled StarStream™ GigaScale Mixed-Signal System Verification, FTL Systems, Inc. presented at the DARPA/MTO Team/NeoCAD Program Review, Feb. 23, 2004, Scottsdale, AZ, Monterey, CA, a public unclassified meeting.
StarStream Design Summary; FTL Systems, Inc., available at Design Automation Conference (DAC), Jun. 2005, Anaheim, CA.
Gokhale, Maya; "Heterogeneous Processing", Los Alamos Computer Science Institute LACSI 2006, Oct. 17-19, 2006, Santa Fe, NM. Available at www.cct.lsu.edu/~estrabd/LACSI2006/workshops/workshop5/gokhale_mccormick.pdf.
U.S. Appl. No. 11/841,406, Wallach et al.
U.S. Appl. No. 11/847,169, Wallach et al.
International Search Report and Written Opinion issued for PCT/US08/74566 dated Nov. 14, 2008, 9 pgs.
International Search Report and Written Opinion issued for PCT/US08/75828 dated Nov. 18, 2008, 12 pgs.
International Search Report and Written Opinion issued for PCT/US08/73423 dated Nov. 12, 2008, 12 pgs.
Arnold, Jeffrey M., "The Splash 2 Processor and Applications", 1993 IEEE, pp. 482-485.
Gokhale, Maya, "Reconfigurable Computing", Accelerating Computation with Field-Programmable Gate Arrays, © Springer, pp. 4 and 60-64.
Express Corporation, "XSA Board V1.1, V1.2 User Manual" (Release Date: Jun. 23, 2005).
Xess, "XSA-50 Spartan-2 Prototyping Board with 2.5V, 50,000-gate FPGA" (copyright 1998-2008).
L.N. Bhuyan, "Lecture 15: Symmetric Multiprocessor: Cache Protocols", Feb. 28, 2001, 16 pgs.
Levine et al., "Efficient Application Representation for HASTE: Hybrid Architectures with a Single, Transformable Executable", 2003, 10 pgs.
Vassiliadis et al., "The ARISE Reconfigurable Instruction Set Extension Framework", Jul. 16, 2007.
Gerald Estrin, "Organization of Computer Systems—The Fixed Plus Variable Structure Computer", 1960.
Hauck, S. "The Roles of FPGAs in Reprogrammable Systems", Proceedings of the IEEE, vol. 86, No. 4, 615-638, Apr. 1998.
Shirazi et al., "Run-Time Management of Dynamically Reconfigurable Designs", Field-Programmable Logic and Applications from FPGAs to Computing Paradigm, 1998.
Page, I., "Reconfigurable Processor Architectures", Microprocessors and Microsystems, vol. 20, Issue 3 May 1996, pgp 185-196.
Callahan et al., "The GARP Architecture and C Compiler", Computer, vol. 33, No. 4. pp. 62-69, Apr. 2000.
Belgard, Rich, "Reconfigurable Illogic", Microprocessor, The Insiders Guide to Microprocessor Hardware, May 10, 2004, 4 pgs.
Trednnick, Nick et al., "Microprocessor Sunset", Microprocessor, The Insiders Guide to Microprocessor Hardware, May 3, 2004, 4 pgs.
Bosky Agarwal, "Instruction Fetch Execute Cycle," CS 518 Fall 2004. pp. 1-10.
The Cell Project at IBM Research, "The Cell Synergistic Processor Unit," http://www.research.ibm.com/cell/SPU.html.
The Cell Project at IBM Research, "Heterogeneous Chip Multiprocessing," http://www.research.ibm.com/cell/heterogeneousCMP.html.
A. E. Eichenberger, et al., "Using Advanced Compiler Technology to Exploit the Performance of the Cell Broadband Engine™ Architecture" IBM Systems Journal, vol. 45, No. 1, 2006.
Keswani, R., "Computational Model for Re-entrant Multiple Hardware Threads," Electronics and Communications Engineering. Osmania University, Hyderabad, India, 2002, 88 pages.
Hauck et al., "Software Technologies for Reconfigurable Systems," Northwestern University, Dept. of ECE, Technical Report, 1996, 40 pages.
Leidel et al., "CHOMP: A Framework and Instruction Set for Latency Tolerant, Massively Multithreaded Processors," Convey Computer Corporation, Richardson Texas, 12 pages.
Bombieri, N., "HIFSuite: Tools for HDL Code Conversion and Manipulation," Dec. 1, 2009, Accepted Oct. 12, 2010, Hindawi Publishing Corporation, 20 pages.
FreeBSD, "Manual Reference Pages—A.OUT (5)," Jun. 5, 1993, 6 pages.
International Search Report and Written Opinion issued for PCT/US2009/051096, dated Oct. 29, 2009, 9 pages.
Akverson et al., "The Tera Computer System," Tera Computer Company, Seattle, Washington USA, pp. 1-6.
Bekerman et al., "Performance and Hardware Complexity Tradeoffs in Designing Multithreaded Architectures," 1089-795X/96 © 1996 IEEE, Proceedings of PACT '96, pp. 24-34.
Tumeo et al., "Designing Next-Generation Massively Multithreaded Architectures for Irregular Applications," Pacific Northwest National Laboratory, Computer, Published by the IEEE Computer Society, 0018-9162/12/$31.00 © 2012 IEEE, Aug. 2012, pp. 42-50.
International Search Report and Written Opinion issued for PCT/US2013/042439, dated Dec. 16, 2013, 10 pages.
Kumar et al., "Single-ISA Heterogeneous Multi-core Architectures: The Potential for Processor Power Reduction, 36th Annual IEEE/ACM International Symposium on Microarchitecture 2003," Dec. 2003, Retrieved on [Jun. 7, 2013] Retrieved from the Internet: URLhttp://ieeexplore.ieee.org/stamp/stamp.jsp?tp=&arnumber=1253185, 12 pages.
Fidanci et al., "Performance and Overhead in a Hybrid Reconfigurable Computer," Proceedings. International Parallel and Distributed Processing Symposium 2003, Apr. 2003, Retrieved on [Jun. 7, 2013], Retrieved from the Internet: URL<http://ieeexplore.ieee.org/stamp/stamp.jsp?tp=&arnumber=1213325>, 8 pages.

\* cited by examiner

MICROPROCESSOR ARCHITECTURE HAVING ALTERNATIVE MEMORY ACCESS PATHS

The present application relates to the following co-pending and commonly-assigned U.S. Patent Applications: 1) U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET", 2) U.S. patent application Ser. No. 11/854,432 filed Sep. 12, 2007 titled "DISPATCH MECHANISM FOR DISPATCHING INSTRUCTIONS FROM A HOST PROCESSOR TO A CO-PROCESSOR", and 3) U.S. patent application Ser. No. 11/847,169 filed Aug. 29, 2007 titled "COMPILER FOR GENERATING AN EXECUTABLE COMPRISING INSTRUCTIONS FOR A PLURALITY OF DIFFERENT INSTRUCTION SETS", the disclosures of which are hereby incorporated herein by reference.

TECHNICAL FIELD

The following description relates generally to multi-processor systems, and more particularly to a system having two memory access paths: 1) a cache-access path in which block data is fetched from main memory for loading to a cache, and 2) a direct-access path in which individually-addressed data is fetched from main memory for directly loading data into processor registers and/or storing data.

BACKGROUND

The popularity of computing systems continues to grow and the demand for improved processing architectures thus likewise continues to grow. Ever-increasing desires for improved computing performance/efficiency has led to various improved processor architectures. For example, multi-core processors are becoming more prevalent in the computing industry and are being used in various computing devices, such as servers, personal computers (PCs), laptop computers, personal digital assistants (PDAs), wireless telephones, and so on.

In the past, processors such as CPUs (central processing units) featured a single execution unit to process instructions of a program. More recently, computer systems are being developed with multiple processors in an attempt to improve the computing performance of the system. In some instances, multiple independent processors may be implemented in a system. In other instances, a multi-core architecture may be employed, in which multiple processor cores are amassed on a single integrated silicon die. Each of the multiple processors (e.g., processor cores) can simultaneously execute program instructions. This parallel operation of the multiple processors can improve performance of a variety of applications.

A multi-core CPU combines two or more independent cores into a single package comprised of a single piece silicon integrated circuit (IC), called a die. In some instances, a multi-core CPU may comprise two or more dies packaged together. A dual-core device contains two independent microprocessors and a quad-core device contains four microprocessors. Cores in a multi-core device may share a single coherent cache at the highest on-device cache level (e.g., L2 for the Intel® Core 2) or may have separate caches (e.g. current AMD® dual-core processors). The processors also share the same interconnect to the rest of the system. Each "core" may independently implement optimizations such as superscalar execution, pipelining, and multithreading. A system with N cores is typically most effective when it is presented with N or more threads concurrently.

One processor architecture that has been developed utilizes multiple processors (e.g., multiple cores), which are homogeneous in that they are all implemented with the same fixed instruction sets (e.g., Intel's x86 instruction set) AMD's Opteron instruction set, etc.). Further, the homogeneous processors may employ a cache memory coherency protocol, as discussed further below.

In general, an instruction set refers to a list of all instructions, and all their variations, that a processor can execute. Such instructions may include, as examples, arithmetic instructions, such as ADD and SUBTRACT; logic instructions, such as AND, OR, and NOT; data instructions, such as MOVE, INPUT, OUTPUT, LOAD, and STORE; and control flow instructions, such as GOTO, if X then GOTO, CALL, and RETURN. Examples of well-known instruction sets include x86 (also known as IA-32), x86-64 (also known as AMD64 and Intel® 64), AMD's Opteron, VAX (Digital Equipment Corporation), IA-64 (Itanium), and PA-RISC (HP Precision Architecture).

Generally, the instruction set architecture is distinguished from the microarchitecture, which is the set of processor design techniques used to implement the instruction set. Computers with different microarchitectures can share a common instruction set. For example, the Intel® Pentium and the AMD® Athlon implement nearly identical versions of the x86 instruction set, but have radically different internal microarchitecture designs. In all these cases the instruction set (e.g., x86) is fixed by the manufacturer and directly hardware implemented, in a semiconductor technology, by the microarchitecture. Consequently, the instruction set is fixed for the lifetime of this implementation.

Cache memory coherency is an issue that affects the design of computer systems in which two or more processors share a common area of memory. In general, processors often perform work by reading data from persistent storage (e.g., disk) into memory, performing some operation on that data, and then storing the result back to persistent storage. In a uniprocessor system, there is only one processor doing all the work, and therefore only one processor that can read or write the data values. Moreover a simple uniprocessor can only perform one operation at a time, and thus when a value in storage is changed, all subsequent read operations will see the updated value. However, in multiprocessor systems (e.g., multi-core architectures) there are two or more processors working at the same time, and so the possibility that the processors will all attempt to process the same value at the same time arises. Provided none of the processors updates the value, then they can share it indefinitely; but as soon as one updates the value, the others will be working on an out-of-date copy of the data. Accordingly, in such multiprocessor systems a scheme is generally required to notify all processors of changes to shared values, and such a scheme that is employed is commonly referred to as a "cache coherence protocol." Various well-known protocols have been developed for maintaining cache coherency in multi-processor systems, such as the MESI protocol, MSI protocol, MOSI protocol, and the MOESI protocol, are examples. Accordingly, such cache coherency generally refers to the integrity of data stored in local caches of the multiple processors.

FIG. 1 shows an exemplary prior art system 100 in which multiple homogeneous processors (or cores) are implemented. System 100 comprises two subsystems: 1) a main memory (physical memory) subsystem 101 and 2) a processing subsystem 102 (e.g., a multi-core die). System 100 includes a first microprocessor core 104A and a second microprocessor core 104B. In this example, microprocessor cores 104A and 104B are homogeneous in that they are each implemented to have the same, fixed instruction set, such as x86. Further, in this example, cores 104A and 104B are implemented on a common die 102. Main memory 101 is communicatively connected to processing subsystem 102. Main memory 101 comprises a common physical address space that microprocessor cores 104A and 104B can each reference.

As shown further shown, a cache 103 is also implemented on die 102. Cores 104A and 104B are each communicatively coupled to cache 103. As is well known, a cache generally is memory for storing a collection of data duplicating original values stored elsewhere (e.g., to main memory 101) or computed earlier, where the original data is expensive to fetch (due to longer access time) or to compute, compared to the cost of reading the cache. In other words, a cache 103 generally provides a temporary storage area where frequently accessed data can be stored for rapid access. Once the data is stored in cache 103, future use can be made by accessing the cached copy rather than re-fetching tie original data from main memory 101, so that the average access time is shorter. In many systems, cache access times are approximately 50 times faster than similar accesses to main memory 101. Cache 103, therefore, helps expedite data access that the micro-cores 104A and 104B would otherwise have to fetch from main memory 101.

In many system architectures, each core 104A and 104B will have its own cache also, commonly called the "L1" cache, and cache 103 is commonly referred to as the "L2" caches. Unless expressly stated herein, cache 103 generally refers to any level of cache that may be implemented, and thus may encompass L1, L2, etc. Accordingly, while shown for ease of illustration as a single block that is accessed by both of cores 104A and 104B, cache 103 may include L1 cache that is implemented for each core. Again, a cache coherency protocol may be employed to maintain the integrity of data stored in local caches of the multiple processor cores 104A/104B, as is well known.

In many architectures, virtual addresses are utilized. In general, a virtual address is an address identifying a virtual (non-physical) entity. As is well-known in the art, virtual addresses may be utilized for accessing memory. Virtual memory is a mechanism that permits data that is located on a persistent storage medium (e.g., disk) to be referenced as if the data was located in physical memory. Translation tables, maintained by the operating system, are used to determine the location of the reference data (e.g., disk or main memory). Program instructions being executed by a processor may refer to a virtual memory address, which is translated into a physical address. To minimize the performance penalty of address translation, most modern CPUs include an on-chip Memory Management Unit (MMU), and maintain a table of recently used virtual-to-physical translations, called a Translation Look-aside Buffer (TLB). Addresses with entries in the TLB require no additional memory references (and therefore time) to translate. However, the TLB can only maintain a fixed number of mappings between virtual and physical addresses; when the needed translation is not resident in the TLB, action will have to be taken to load it in.

As an example, suppose a program's instruction stream that is being executed by a processor, say processor core 104A of FIG. 1, desires to load data from an address "Foo" into a first general-purpose register, GPR1. Such instruction may appear similar to "LD <Foo>, GRP1". Foo, in this example, is a virtual address that the processor translates to a physical address, such as address "123456". Thus, the actual physical address, which may be formatted according to a global physical memory address format, is used to access cache 103 and/or memory 101.

Traditional implementations of cache 103 have proven to be extremely effective in many areas of computing because access patterns in many computer applications have locality of reference. There are several kinds of locality, including data that are accessed close together in time (temporal locality) and data that is located physically close to each other (spatial locality).

In operation, each of cores 104A and 104B reference main memory 101 by providing a physical memory address. The physical memory address (of data or "an operand" that is desired to be retrieved) is first inputted to cache 103. If the addressed data is not encached (i.e., not present in cache 103), the sane physical address is presented to main memory 101 to retrieve the desired data.

In contemporary architectures a cache block is fetched from main memory 101 and loaded into cache 103. That is, rather than retrieving only the addressed data from main memory 101 for storage to cache 103, a larger block of data may be retrieved for storage to cache 103. A cache block typically comprises a fixed-size amount of data that is independent of the actual size of the requested data. For example, in most implementations a cache block comprises 64 bytes of data that is fetched from main memory 101 and loaded into cache 103 independent of the actual size of the operand referenced by the requesting micro-core 104A/104B. Furthermore, the physical address of the cache block referenced and loaded is a block address. This means that all the cache block data is in sequentially contiguous physical memory. Table 1 below shows an example of a cache block.

TABLE 1

| Physical Address | Operand |
|---|---|
| X, Y, Z (7) | Operand 7 |
| X, Y, Z (6) | Operand 6 |
| . . . | . . . |
| X, Y, Z (1) | Operand 1 |
| X, Y, Z (0) | Operand 0 |

In the example of table 1 in response to a micro-core 104/104B requesting Operand 0 via its corresponding physical address X,Y,Z (0), a 64-byte block of data may be fetched from main memory 101 and loaded into cache 103, wherein such block of data includes not only Operand 0 but also Operands 1-7. Thus, depending on the fixed size of the cache block employed on a given system, whenever a core 104A/104B references one operand (e.g. a simple load), the memory system will bring in 4 to 8 to 16 operands into cache 103.

There are both advantages and disadvantages of this traditional approach. One advantage is that if there is temporal (over time) and spatial (data locality) references to operands (e.g., operands 0-7 in the example of Table 1), then cache 103 reduces the memory access time. Typically, cache access times (and data bandwidth) are 50 times faster than similar access to main memory 101. For many applications, this is the memory access pattern.

However, if the memory access pattern of an application is not sequential and/or does not re-use data, inefficiencies arise which result in decreased performance. Consider the following FORTRAN loop that may be executed for a given application:

```
DO I=1, N, 4
   A(i) = B(i) + C(i)
END DO
```

In this loop, every fourth element is used. If a cache block maintains 8 operands, then only 2 of the 8 operands are used. Thus, 6/8 of the data loaded into cache 103 and 6/8 of the memory bandwidth is "wasted" in this example.

In some architectures, special-purpose processors that are often referred to as "accelerators" are also implemented to perform certain types of operations. For example, a processor executing a program may offload certain types of operations to an accelerator that is configured to perform those types of operations efficiently. Such hardware acceleration employs hardware to perform some function faster than is possible in software running on the normal (general-purpose) CPU. Hardware accelerators are generally designed for computationally intensive software code. Depending upon granularity, hardware acceleration can vary from a small functional unit to a large functional block like motion estimation in MPEG2. Examples of such hardware acceleration include blitting acceleration functionality in graphics processing units (GPUs) and instructions for complex operations in CPUs. Such accelerator processors generally have a fixed instruction set that differs from the instruction set of the general-purpose processor, and the accelerator processor's local memory does not maintain cache coherency with the general-purpose processor.

A graphics processing unit (GPU) is a well-known example of an accelerator. A GPU is a dedicated graphics rendering device commonly implemented for a personal computer, workstation, or game console. Modern GPUs are very efficient at manipulating and displaying computer graphics, and their highly parallel structure makes them more effective than typical CPUs for a range of complex algorithms. A GPU implements a number of graphics primitive operations in a way that makes running them much faster than drawing directly to the screen with the host CPU. The most common operations for early two-dimensional (2D) computer graphics include the BitBLT operation (combines several bitmap patterns using a RasterOp), usually in special hardware called a "blitter", and operations for drawing rectangles triangles, circles, and arcs. Modern GPUs also have support for three-dimensional (3D) computer graphics, and typically include digital video-related functions.

Thus, for instance, graphics operations of a program being executed by host processors 104A and 104B may be passed to a GPU. While the homogeneous host processors 104A and 104B maintain cache coherency with each other, as discussed above with FIG. 1 they do not maintain cache coherency with accelerator hardware of the GPU. This means that the GPU reads and writes to its local memory are NOT part of the hardware-based cache coherency mechanism used by processors 104A and 104B. This also means that the CPU does not share the same physical or virtual address space of processors 104A and 104B.

Additionally, various devices are known that are reconfigurable. Examples of such reconfigurable devices include field-programmable gate arrays (FPGAs). A field-programmable gate array (FPGA) is a well-known type of semiconductor device containing programmable logic components called "logic blocks", and programmable interconnects. Logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memories. A hierarchy of programmable interconnects allows logic blocks to be interconnected as desired by a system designer. Logic blocks and interconnects can be programmed by the customer/designer, after the FPGA is manufactured, to implement any logical function, hence the name "field-programmable."

SUMMARY

The present invention is directed to a system and method which employ two memory access paths: 1) a cache-access path in which block data is fetched from main memory for loading to a cache, and 2) a direct-access path in which individually-addressed data is fetched from main memory for directly loading data into processor registers and/or storing data. The memory access techniques described herein may be employed for both loading and storing data. Thus, while much of the description provided herein is directed toward exemplary applications of fetching and loading data, it should be understood that the techniques may be likewise applied for storing data. The system may comprise one or more processor cores that utilize the cache-access path for accessing data. The system may further comprise at least one heterogeneous functional unit that is operable to utilize the direct-access path for accessing data. In certain embodiments, the one or more processor cores, cache, and the at least one heterogeneous functional unit may be included on a common semiconductor die (e.g., as part of an integrated circuit). As described further herein, embodiments of the present invention enable improved system performance by selectively employing the cache-access path for certain instructions (e.g., selectively having the processor core(s) process certain instructions) while selectively employing the direct-access path for other instructions (e.g., by offloading those other instructions to the heterogeneous functional unit).

Embodiments of the present invention provide a system in which two memory access paths are employed for accessing data by two or more processing nodes. A first memory access path (which may be referred to herein as a "cache-access path" or a "block-oriented access path") is a path in which a block of data is fetched from main memory to cache. This cache-access path is similar to the traditional memory access described above, whereby if the desired data is present in cache, it is accessed from the cache and if the desired data is not present in the cache it is fetched from main memory and loaded into the cache. Such fetching may load not only the desired data into cache, but may also load some fixed block of data, commonly referred to as a "cache block" as discussed above (e.g., a 64-byte cache block). A second memory access path (which may be referred to herein as a "direct-access path", "cache-bypass path", or "address-oriented access") enables the cache to be bypassed to retrieve data directly from main memory. In such a direct access, data of an individual physical address that is requested may be retrieved, rather than retrieving a block of data that encompasses more than what is desired.

According to certain embodiments of the present invention the main memory is implemented as non-sequential access main memory that supports random address accesses as opposed to block accesses. That is, upon requesting a given physical address, the main memory may return a corresponding operand (data) that is stored to the given physical address, rather than returning a fixed block of data residing at physical addresses. In other words, rather than returning a fixed block of data (e.g., a 64-byte block of data as described in Table 1 above) independent of the requested physical address, the main memory is implemented such that it is dependent on the requested physical address requested (i.e., is capable of returning only the individual data residing at the requested physical address).

When being accessed directly (via the "direct-access path") the main memory returns the data residing at a given requested physical address, rather than returning a fixed block of data that is independent (in size) of the requested physical address. Thus, rather than a block-oriented access, an address-oriented access may be performed in which only the data for the requested physical address is retrieved. Further, when being accessed via the cache-access path, the main memory is capable of returning a cache block of data. For instance, the non-sequential access main memory can be used to emulate a block reference when desired for loading to a cache, but also supports individual random address accesses without requiring a block load (e.g., when being accessed via the direct-access path). Thus, the same non-sequential access main memory is utilized (with the same physical memory addresses) for both the direct-access and cache-access paths. According to one embodiment, the non-sequential access main memory is implemented by scatter/gather DIMMs (dual in-line memory modules).

According to certain embodiments, the above-mentioned memory architecture is implemented in a system that comprises at least one processor and at least one heterogeneous functional unit. As an example, a semiconductor die (e.g., die 102 of FIG. 1) may comprise one or more processors, such as micro-cores 104A and 104B of FIG. 1, and the semiconductor die may further comprise a heterogeneous functional unit, such as a FPGA or other type of functional unit. In certain embodiments a multi-processor system is implemented; for instance, a plurality of micro-cores (e.g., cores 104A and 104B of FIG. 1) may be implemented on the semiconductor die.

The processor(s) may utilize the cache-access path for accessing memory, while the heterogeneous functional unit is operable to utilize the direct-access path. Thus, certain instructions being processed for a given application may be off-loaded from the one or more processors to the heterogeneous functional unit such that the heterogeneous functional unit may take advantage of the cache-bypass path to access memory for processing those off-loaded instructions. For instance, again consider the following FORTRAN loop that may be executed for a given application:

```
DO I=1, N, 4
    A(i) = B(i) + C(i)
END DO
```

In this loop, every fourth element (or physical memory address) is used, loaded or stored. As discussed above, if a cache-access path is utilized in which a cache block of 8 operands is retrieved for each access of main memory, then only 2 of the 8 operands are used, and ⅝ of the data loaded into the cache and ⅝ of the memory bandwidth is "wasted" in this example. In certain embodiments of the present invention, such DO loop operation may be off-loaded to the heterogeneous functional unit, which may retrieve the individual data elements desired to be accessed directly from the non-sequential access main memory.

As mentioned above, the cache block memory access approach is beneficial in many instances, such as when the data accesses have temporal and/or spatial locality, but such cache block memory access is inefficient in certain instances, such as in the exemplary DO loop operation above. Accordingly, by selectively employing the cache-access path for certain instructions and employing the direct-access path for other instructions, the overall system performance can be improved. That is, by oft-loading certain instructions to a heterogeneous functional unit that is operable to bypass cache and access individual data (e.g., random, non-sequential addresses) from main memory, rather than requiring fetching of fixed block size of data from main memory, while permitting the cache block memory access to be utilized by the one or more processors (and thus gain the benefits of the cache for those instructions that have temporal and/or spatial locality), the system performance can be improved.

In certain embodiments, the heterogeneous functional unit implemented comprises a different instruction set than the native instruction set of the one or more processors. Further, in certain embodiments, the instruction set of the heterogeneous functional unit may be dynamically reconfigurable. As an example, in one implementation three (3) mutually-exclusive instruction sets may be pre-defined, any of which may be dynamically loaded to the heterogeneous functional unit. As an illustrative example, a first pre-defined instruction set might be a vector instruction set designed particularly for processing 64-bit floating point operations as are commonly encountered in computer-aided simulations, a second pre-defined instruction set might be designed particularly for processing 32-bit floating point operations as are commonly encountered in signal and image processing applications, and a third pre-defined instruction set might be designed particularly for processing cryptography-related operations. While three illustrative pre-defined instruction sets are described above, it should be recognized that embodiments of the present invention are not limited to the exemplary instruction sets mentioned above. Rather, any number of instruction sets of any type may be pre-defined in a similar manner and may be employed on a given system in addition to or instead of one or more of the above-mentioned pre-defined instruction sets.

Further, in certain embodiments the heterogeneous functional unit contains some operational instructions that are part of the native instruction set of the one or more processors (e.g., micro-cores). For instance, in certain embodiments, the x86 (or other) instruction set may be modified to include certain instructions that are common to both the processor(s) and the heterogeneous functional unit. For instance, certain operational instructions may be included in the native instruction set of the processor(s) for off-loading instructions to the heterogeneous functional unit.

For example, in one embodiment, the instructions of an application being executed are decoded by the one or more processors (e.g., micro-core(s)). Suppose that the processor fetches a native instruction (e.g., X86 instruction) that is called, as an example, "Heterogeneous Instruction 1". The decode logic of the processor determines that this is an instruction to be off-loaded to the heterogeneous functional unit, and thus in response to decoding the Heterogeneous Instruction 1, the processor initiates a control sequence to the heterogeneous functional unit to communicate the instruction to the heterogeneous functional unit for processing. So, the processor (e.g., micro-core) may decode the instruction and initiate the heterogeneous functional unit via a control line. The heterogeneous functional unit then sends instructions to reference memory via the direct-access path.

In certain embodiments, the heterogeneous functional unit comprises a co-processor, such as the exemplary co-processor disclosed in co-pending and commonly assigned U.S. patent application Ser. No. 11/841,406 filed Aug. 20, 2007 titled "MULTI-PROCESSOR SYSTEM HAVING AT LEAST ONE PROCESSOR THAT COMPRISES A DYNAMICALLY RECONFIGURABLE INSTRUCTION SET", and U.S. patent application Ser. No. 11/854,432 filed Sep. 12, 2007 titled "DISPATCH MECHANISM FOR DISPATCHING INSTRUCTIONS FROM A HOST PROCESSOR TO A CO-PROCESSOR," the disclosures of which have been incorporated herein by reference.

According to certain embodiments, an exemplary multi-processor system in which such dispatch mechanism may be employed is described. While an exemplary multi-processor system that comprises heterogeneous processors (i.e., having different instruction sets) is described herein, it should be recognized that embodiments of the dispatch mechanism described herein are not limited to the exemplary multi-processor system described. As one example, according to certain embodiments, a multi-processor system that comprises at least one processor having a dynamically reconfigurable instruction set. According to certain embodiments, at least one host processor is implemented in the system, which may comprise a fixed instruction set, such as the well-known x86 instruction set. Additionally, at least one co-processor is implemented, which comprises dynamically reconfigurable logic that enables the co-processor's instruction set to be dynamically reconfigured. In this manner, the at least one host processor and the at least one dynamically reconfigurable co-processor are heterogeneous processors because the dynamically reconfigurable co-processor may be configured to have a different instruction set than that of the at least one host processor. According to certain embodiments, the co-processor may be dynamically reconfigured with an instruction set for use in optimizing performance of a given executable. For instance, in certain embodiments, one of a plurality of predefined instruction set images may be loaded onto the co-processor for use by the co-processor in processing a portion of a given executable's instruction stream.

In certain embodiments, an executable (e.g., an a.out file or a.exe file, etc.) may include (e.g., in its header) an identification of an instruction set with which the co-processor is to be configured for use in processing a portion of the executable's instruction stream. Accordingly, when the executable is initiated, the system's operating system (OS) may determine whether the co-processor possesses the instruction set identified for the executable. If determined that the co-processor does not possess the identified instruction set, the OS causes the co-processor to be reconfigured to possess such identified instruction set. Then, a portion of the instructions of the executable may be off-loaded for processing by the co-processor according to its instruction set, while a portion of the executable's instructions may be processed by the at least one host processor. Accordingly, in certain embodiments, a single executable may have instructions that are processed by different, heterogeneous processors that possess different instruction sets. As described further herein, according to certain embodiments, the co-processor's instructions are decoded as if they were defined with the host processor's instruction set (e.g., x86's ISA). In essence, to a compiler, it appears that the host processor's instruction set (e.g., the x86 ISA) has been extended.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 2:
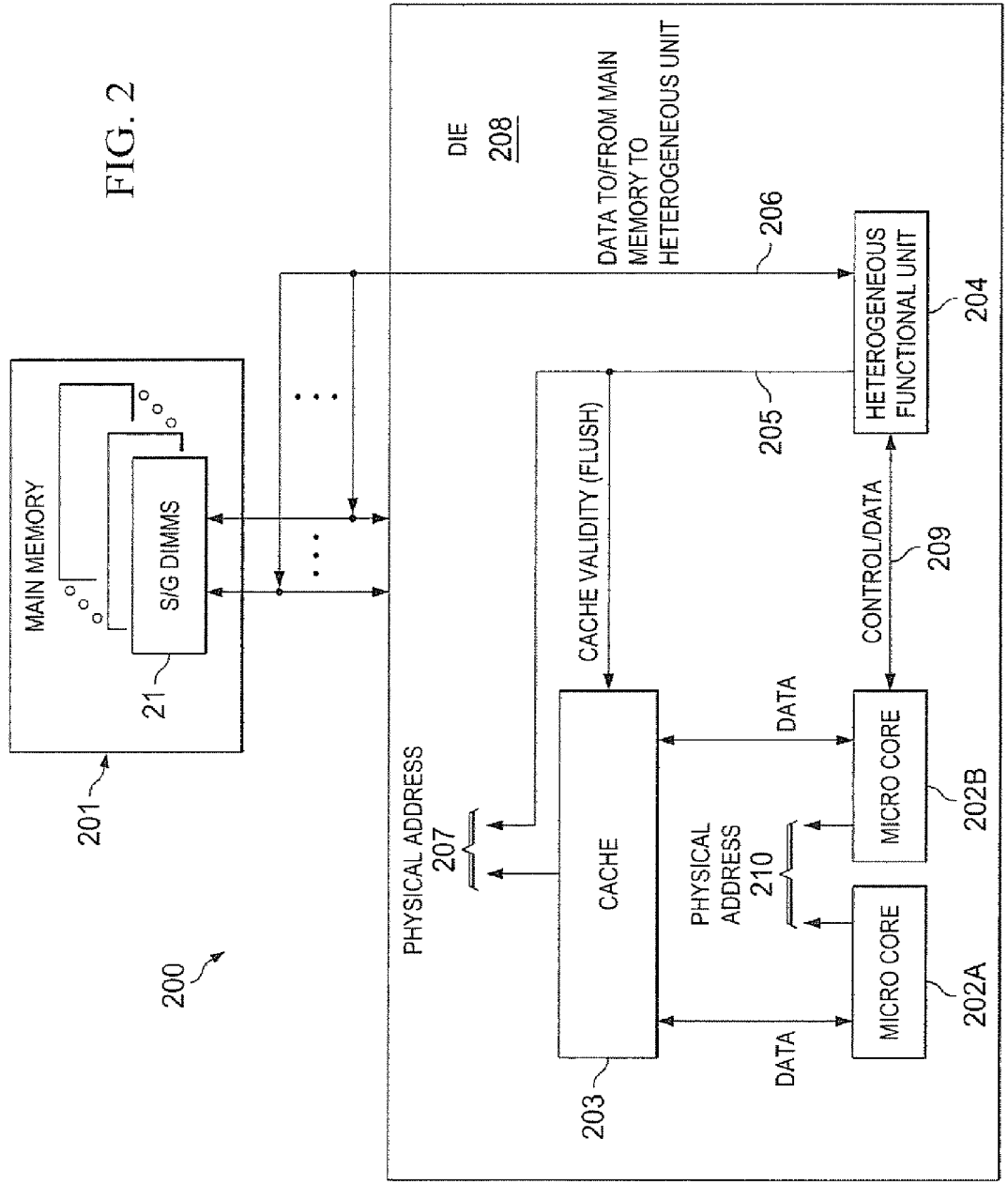
FIG. 2 shows a block diagram of an exemplary system architecture of an embodiment of the present invention.

FIG. 2 shows a block diagram of a system 200 according to one embodiment of the present invention. System 200 comprises two subsystems: 1) main memory (physical memory) subsystem 201 and processor subsystem (semiconductor die) 208. The combination of subsystems 201 and 208 permit programs to be executed, i.e. instructions are executed in processor subsystem 208 to process data stored in main memory subsystem 201. As described further herein, processor subsystem 208 comprises one or more processor cores (two processor cores, 202A and 202B, in the illustrated example), cache 203, and a heterogeneous functional unit 204. In the illustrated example, all elements of processor subsystem 208 are implemented on a common die.

System 200 employs two memory access paths: 1) a cache-access path in which block data is stored/loaded to/from main memory 201 to/from cache 203, and 2) a direct-access path in which individually-addressed data is stored/loaded to/from main memory 201 (e.g., along path 206 in system 200). For instance, system 200 employs a cache-access path in which block data may be stored to main memory 201 and in which block data may be loaded from main memory) 201 to cache 203. Additionally, system 200 employs a direct-access path in which individually-addressed data, rather than a fixed-size block of data, may be stored to main memory 201 and in which individually-addressed data may be loaded from main memory 201 (e.g., along path 206 in system 200) to a processor register (e.g., of heterogeneous functional unit 204).

System 200 comprises two processor cores, 202A and 202B, that utilize the cache-access path for accessing data from main memory 201. System 200 further comprises at least one heterogeneous functional unit 204 that is operable to utilize the direct-access path for accessing data from main memory 201. As described further herein, embodiments of the present invention enable improved system performance by selectively employing the cache-access path for certain instructions (e.g., selectively having the processor core(s) 202A/202B process certain instructions) while selectively employing the direct-access path for other instructions (e.g., by offloading those other instructions to the heterogeneous functional unit 204).

Figure 1:
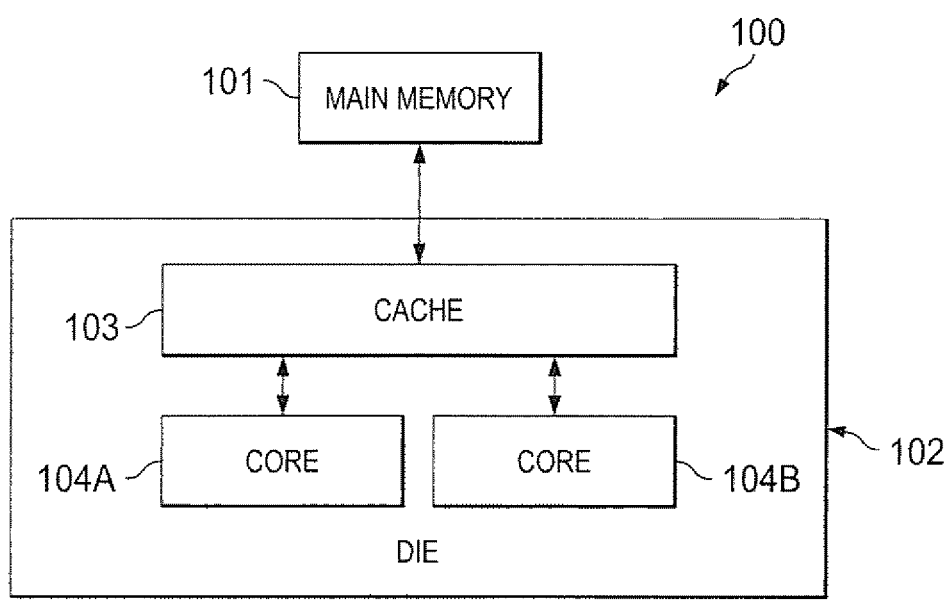
FIG. 1 shows a block diagram of an exemplary system architecture of the prior art.

Embodiments of the present invention provide a system in which two memory access paths are employed for accessing data by two or more processing nodes. A first memory access path (which may be referred to herein as a "cache-access path" or a "block-oriented access path") is a path in which a block of data is fetched from main memory 201 to cache 203. This cache-access path is similar to the traditional memory access described above with FIG. 1, whereby the processor core decodes an instruction and determines a physical address 210 of desired data. If the desired data (i.e., at the referenced physical address) is present in cache 203 it is accessed from cache 203, and if the desired data is not present in cache 203, the physical address is used to fetch (via path 207) the data from main memory 201, which is loaded into cache 203. Such fetching from main memory 201 may load not only the desired data residing at the referenced physical address into cache 203, but may also load some fixed block of data, commonly referred to as a "cache block" as discussed above (e.g., a 64-byte cache block such as that discussed with Table 1). A second memory access path (which may be referred to herein as a "direct-access path", "cache-bypass path", or "address-oriented access") enables cache 203 to be bypassed to retrieve data directly from main memory 201. In such a direct access, data of an individual physical address that is requested may be retrieved from main memory 201, rather than retrieving a fixed-size block of data that encompasses more than what is desired.

According to certain embodiments of the present invention the main memory is implemented as non-sequential access main memory that supports random address accesses as opposed to block accesses. That is, upon requesting a given physical address, the main memory may return a corresponding operand (data) that is stored to the given physical address, rather than returning a fixed block of data residing at physical addresses. In other words, rather than returning a fixed block of data (e.g., a 64-byte block of data) independent of the requested physical address, the main memory is implemented such that it is dependent on the requested physical address requested (i.e., is capable of returning only the individual data residing at the requested physical address).

According to certain embodiments, processor cores 202A and 202B are operable to access data in a manner similar to that of traditional processor architectures (e.g., that described above with FIG. 1). That is, processor cores 202A and 202B are operable to access data via the cache-access path, in which a fixed-size block of data is fetched from main memory 201 for loading into cache 203, such as described above with exemplary Table 1. In addition, in certain embodiments, processor cores 202A and 202B are operable to off-load (e.g., via control line 209) certain instructions for processing by heterogeneous functional unit 204, which is operable to access data via the direct-access path 206.

When being accessed directly (via the "direct-access path" 206), main memory 201 returns the data residing at a given requested physical address, rather than returning a fixed-size block of data that is independent (in size) of the requested physical address. Thus, rather than a block-oriented access, an address-oriented access may be performed in which only the data for the requested physical address is retrieved. Further, when being accessed via the cache-access path, main memory 201 is capable of returning a cache block of data. For instance, the non-sequential access main memory 201 can be used to emulate a block reference when desired for loading a cache block of data to cache 203, but also supports individual random address accesses without requiring a block load (e.g., when being accessed via the direct-access path 206). Thus, the same non-sequential access main memory 201 is utilized (with the same physical memory addresses) for both the cache-access path (e.g., utilized for data accesses by processor cores 202A and 202B in this example) and the direct-access path (e.g., utilized for data access by heterogeneous functional unit 204). According to one embodiment, non-sequential access main memory 201 is implemented by scatter/gather DIMMs (dual in-line memory modules) 21.

Thus, main memory subsystem 201 supports non-sequential memory references. According to one embodiment, main memory subsystem 201 has the following characteristics:

1) Each memory location is individually addressed. There is no built-in notion of a cache block.

2) The entire physical memory is highly interleaved. Interleaving means that each operand resides in its individually controlled memory location.

3) Thus, full memory bandwidth is achieved for a non-sequentially referenced address pattern. For instance, in the above example of the DO loop that accesses every fourth memory address, the fill memory bandwidth is achieved for the address reference pattern: $Address_1$, $Address_5$, $Address_9$, and $Address_{13}$.

4) If the memory reference is derived from a micro-core, then the memory reference pattern is sequential, e.g., physical address reference pattern: $Address_1$, $Address_2$, $Address_3$, . . . $Address_8$ (assuming a cache block of 8 operands or 8 words).

5) Thus, the memory system can support full bandwidth random physical addresses ad can also support full bandwidth sequential addresses.

Given a memory system 201 as described above, a mechanism is further provided in certain embodiments to determine whether a memory reference is directed to the cache 203, or directly to main memory 201. In a preferred embodiment of the present invention, a heterogeneous functional unit 204 provides such a mechanism.

Figure 3A:
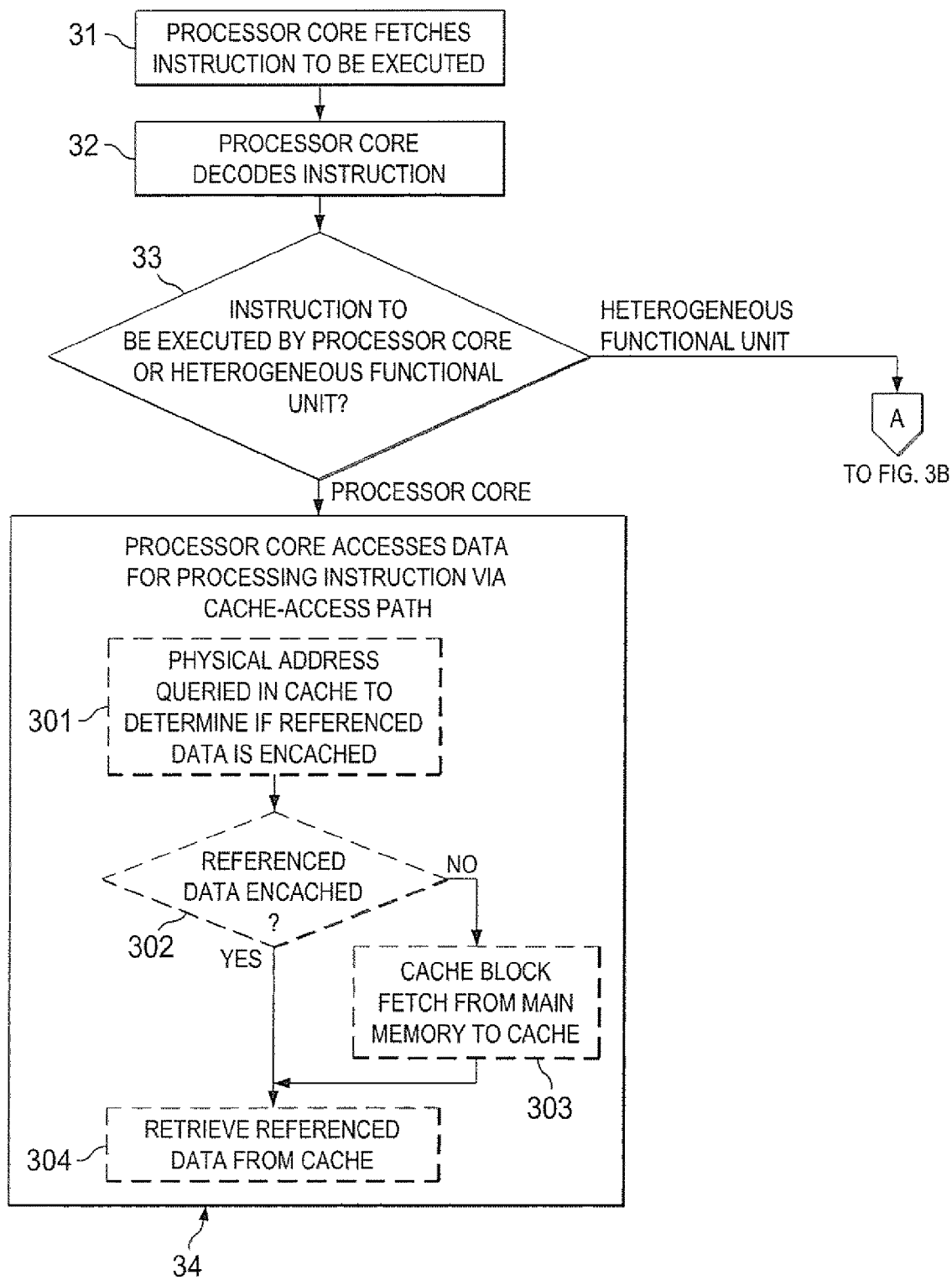
FIGS. 3A-3B show an exemplary operational flow diagram according to one embodiment of the present invention.
Figure 3B:
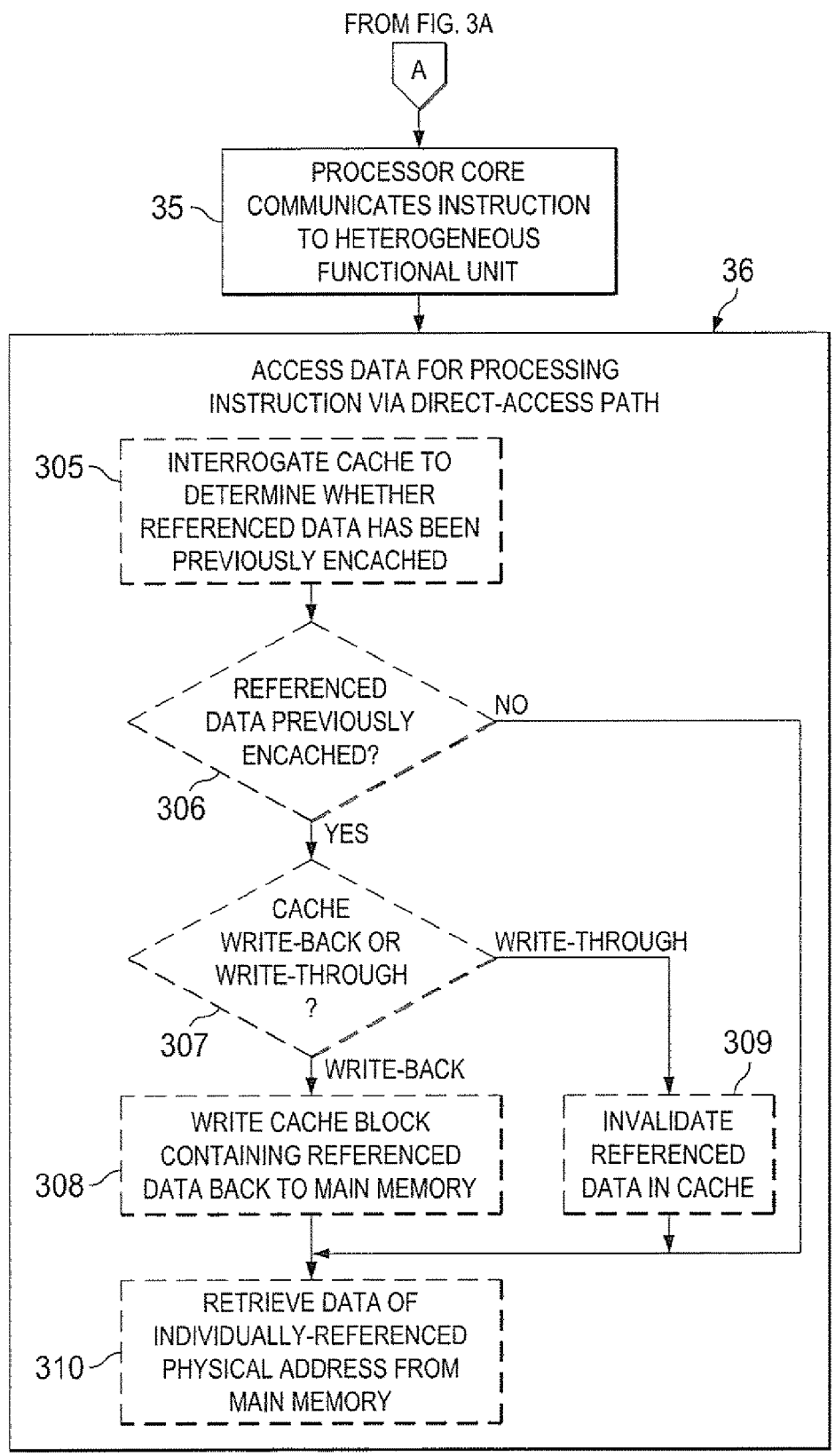

FIGS. 3A-3B show an exemplary operational flow diagram for processing instructions of a program being executed by processor subsystem 208 (of FIG. 2) according to one embodiment of the present invention. In the example of FIGS. 3A-3B, operation of system 200 works as follows: a processor core 202A/202B fetches referenced an instruction (e.g., referenced by a program counter (PC)) of the program being executed in operational block 31. In block 32, the processor core 202A/202B decodes the instruction and determines a physical address 210 at which the desired data resides. In block 33, the processor core determines whether the instruction is to be executed in its entirety by the processor core 202A/202B or whether it is to be executed by heterogeneous functional unit 204. According to one embodiment, as part of the definition of the instruction (i.e., the instruction set architecture), it is a priori determined if the instruction is executed by processor core 202A/202B or heterogeneous functional unit 204. If determined in block 33 that the instruction is to be executed by the processor core 202A/202B, operation advances to block 34 where the processor core 202A/202B accesses data (by referencing its physical address 210) for processing the instruction via a cache-access path. If, on the other hand, it is determined in block 33 that the instruction is to be executed by the heterogeneous functional unit 204, operation advances to block 35 (of FIG. 3B) where the processor core 202A/202B communicates the instruction to the heterogeneous functional unit 204, and then in block 36 the heterogeneous functions unit accesses data for processing the instruction via the direct-access path. Exemplary operations that may be performed in each of the cache-access path 34 and the direct-access path 36 in certain embodiments are described further below.

In certain embodiments, the determination in block 33 may be made based, at least in part, on the instruction that is fetched. For instance, in certain embodiments, the heterogeneous functional unit 204 contains some operational instructions (in its instruction set) that are part of the native instruction set of the processor cores 202A/202B. For instance, in certain embodiments, the x86 (or other) instruction set may be modified to include certain instructions that are common to both the processor core(s) and the heterogeneous functional unit. For instance, certain operational instructions may be included in the native instruction set of the processor core(s) for off-loading instructions to the heterogeneous functional unit.

For example, in one embodiment, the instructions of an application being executed are decoded by the processor core(s) 202A/202B, wherein the processor core may fetch (in operational block 31) a native instruction (e.g., X86 instruction) that is called, as an example, "Heterogeneous Instruction 1". The decode logic of the processor core decodes the instruction in block 32 and determines in block 33 that this is an instruction to be off-loaded to the heterogeneous functional unit 204, and thus in response to decoding the Heterogeneous Instruction 1, the processor core initiates a control sequence (via control line 209) to the heterogeneous functional unit 204 to communicate (in operational block 35) the instruction to the heterogeneous functional unit 204 for processing.

In one embodiment, the cache-path access 34 includes the processor core 202A/202B querying, in block 301, the cache 203 for the physical address to determine if the referenced data (e.g., operand) is encached. In block 302, the processor core 202A/202B determines whether the referenced data is encached in cache 203. If it is encached, then operation advances to block 304 where the processor core 202A/202B retrieves the referenced data from cache 203. If determined in block 302 that the referenced data is not encached, operation advances to block 303 where a cache block fetch from main memory 201 is performed to load a fixed-size block of data, including the referenced data, into cache 203, and then operation advances to block 304 where the processor core retrieves the fetched data from cache 203.

In one embodiment, the direct-access path 36 (of FIG. 3B) includes the heterogeneous functional unit 204 interrogating (via path 205 of FIG. 2), in block 305, cache 203 to determine whether the referenced data has been previously encached. For instance, all memory references by heterogeneous functional unit 204 may use address path (bus) 205 of FIG. 2 to reference physical main memory 201. Data is loaded or stored via bus 206 of FIG. 2. Control path 209 of FIG. 2 is used to initiate control and pass data from processor core 202A/202B to heterogeneous functional unit 204.

In block 306, heterogeneous functional unit 204 determines whether the referenced data has been previously encached in cache 203. If it has not, operation advances to block 310 where the heterogeneous functional unit 204 retrieves the referenced data of the individually-referenced physical address (e.g., physical address 210 and 207 of FIG. 2) from main memory 201. That is, the referenced data is received, via path 206, from the individual-referenced physical address of main memory, rather than receiving a fixed-size block of data (such as a cache block), as is returned from main memory 201 in the cache-path access 34.

If determined in block 306 that the referenced data has been previously cached, then in certain embodiments different actions may be performed depending on the type of caching employed in the system. For instance, in block 307, a determination may be made as to whether the cache is a write-back caching technique or a write-through caching technique, each of which are well-known caching techniques in the art and are thus not described further herein. If a write-back caching technique is employed, then the heterogeneous functional unit 204 writes the cache block of cache 203 that contains the referenced data back to main memory 201, in operational block 308. If a write-through caching technique is employed, then the heterogeneous functional unit 204 invalidates the referenced data in cache 203, in operational block 309. In either case, operation then advances to block 310 to retrieve the referenced data of the individually-referenced physical address (e.g., physical address 210 and 207 of FIG. 2) from main memory 201, as discussed above.

In certain embodiments, if a hit is achieved from the cache in the direct-access path 36 (e.g., as determined in block 306), then the request may be completed from the cache 203, rather than requiring the entire data block to be written back to main memory 201 (as in block 308) and then referencing the single operand from main memory 201 (as in block 310). That is, in certain embodiments, if a hit is achieved for the cache 203, then the memory access request (e.g., store or load) may be satisfied by cache 203 for the heterogeneous functional unit 204, and if a miss occurs for each 203, then the referenced data of the individually-referenced physical address (e.g., physical address 210 and 207 of FIG. 2) may be accessed in main memory 201, as discussed above (e.g., as in block 310). Thus, certain embodiments permit memory access of cache 203 by heterogeneous functional unit 204 (rather than bypassing the cache 203) when the memory access request can be satisfied by cache 203, but when the memory access request cannot be satisfied by cache 203 (i.e., a miss occurs), then an individually-referenced physical address (rather than a block-oriented access) is made of main memory 201.

For all traditional microprocessors of the prior art, main memory (e.g., 101 of FIG. 1) is block-oriented. Block-oriented means that even if one 64-bit word is referenced, 8 to 16 words ARE ALWAYS fetched and loaded into the microprocessor's cache (e.g., cache 103 of FIG. 1). As discussed above, this fixed-size block of 8 to 16 words are called the "cache block". For many applications, only one word of the 8 to 16 words of the cache block that are fetched is used. Consequently, a large amount (e.g., 87%) of the memory bandwidth is wasted (not used). This results in reduced application performance.

Typical of these types of applications are those that reference memory using a vector of indices. This is called "scatter/gather". For example, in the following FORTRAN code:

```
do i= 1,n
    a(i) = b(i)+c(i)
enddo
``` all the elements of a, b, and c are sequentially referenced.
In the following FORTRAN code:

```
do i = 1,n
    a(j(i)) = b(j(i)) + c(j(i))
enddo
``` a, b, and c are referenced through an index vector. Thus, the physical main memory system is referenced by non-sequential memory addresses.

According to certain embodiments, main memory 201 of system 200 comprises a memory dimm that is formed utilizing standard memory DRAMS, that provides full bandwidth memory accesses for non-sequential memory addresses. Thus, if the memory reference pattern is: 1, 20, 33, 55; then only memory words, 1, 20, 33, and 55 are fetched and stored. In fact, they are fetched and stored at the maximum rate permitted by the DRAMs.

In the above example, with the same memory reference pattern, a block-oriented memory system, with a block size of 8 words, would fetch 4 cache blocks to fetch 4 words:
{1 . . . 8}—for word 1;
{17 . . . 24}—for word 20;
{33 . . . 40}—for word 33; and
{51 . . . 56}—for word 55.

In the above-described embodiment of system 200 of FIG. 2, since full bandwidth is achieved for non-sequential memory accesses, full memory bandwidth is achieved for sequential accesses. Accordingly, embodiments of the present invention enable full bandwidth for memory accesses to be achieved for both non-sequential and sequential memory accesses.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
   non-sequential access memory;
   a processor that is operable to process a first portion of instructions included in an executable file;
   a communication bus via which the processor sends a second portion of instructions with specific syntax as appearing in the executable file to a heterogeneous functional unit, wherein the first portion of instructions includes first instructions that are recognized by a first instruction set of the processor and the second portion of instructions includes second instructions that are not recognized by the first instruction set of the processor;
   the heterogeneous functional unit that is operable to execute the second portion of instructions according to the specific syntax;
   cache memory;
   a cache-access path in which block data is communicated between said non-sequential access memory and said cache memory for accesses of said block data by said processor for processing said first portion of instructions; and
   a direct-access path in which individually-addressed data is communicated to/from said non-sequential access memory for accesses of said individually-addressed data by said heterogeneous functional unit for processing said second portion of instructions.

2. The system of claim 1 wherein in said cache-access path said block data is fetched from said non-sequential access memory for loading to said cache memory.

3. The system of claim 1 wherein in said cache-access path said block data is stored to said non-sequential access memory from said cache memory.

4. The system of claim 1 wherein said processor comprises the first instruction set that defines instructions that are executable by said processor, wherein said heterogeneous functional unit comprises the second instruction set that defines instructions that are executable by said heterogeneous functional unit, and wherein said instructions defined in said first instruction set are not executable by said heterogeneous functional unit, and said instructions defined in said second instruction set are not executable by said processor.

5. The system of claim 1 wherein in said direct-access path said individually-addressed data is fetched from said non-sequential access memory to said heterogeneous functional unit.

6. The system of claim 1 wherein in said direct-access path said individually-addressed data is stored to said non-sequential access memory from said heterogeneous functional unit.

7. The system of claim 1 comprising:
   a die on which said processor, said heterogeneous functional unit, and said cache memory are included.

8. The system of claim 1 wherein said processor accesses data via said cache-access path; and wherein said heterogeneous functional unit is operable to access data via said direct-access path.

9. The system of claim 1 wherein said heterogeneous functional unit comprises a dynamically-reconfigurable instruction set.

10. The system of claim 1 wherein said heterogeneous functional unit comprises a field-programmable gate array (FPGA).

11. The system of claim 1 wherein said non-sequential access memory comprises:
    a scatter/gather memory module.

12. The system of claim 1 wherein said non-sequential access memory enables access of individually-referenced physical addresses, rather than block-oriented accesses.

13. The system of claim 1 wherein said system enables full bandwidth memory access for non-sequential memory accesses.

14. The system of claim 13 wherein said system further enables full bandwidth memory access for sequential memory accesses.

15. A system comprising:
non-sequential access main memory; and
a die comprising:
  cache memory,
  a micro-processor core that is operable to process a first portion of instructions included in an executable file and that is operable to access data via a cache-access path in which block data is communicated between said non-sequential access main memory and said cache memory,
  a communication bus via which the micro-processor core is operable to send a second portion of instructions with specific syntax as appearing in the executable file to a heterogeneous functional unit, and
  the heterogeneous functional unit that is operable to execute the second portion of instructions according to the specific syntax and that is operable to access data via a direct-access path in which individually-addressed data is communicated between said heterogeneous functional unit and said non-sequential access main memory.

16. The system of claim 15 wherein in said cache-access path said block data is fetched from said non-sequential access main memory for loading to said cache memory.

17. The system of claim 15 wherein in said direct-access path said individually-addressed data is fetched from said non-sequential access main memory.

18. The system of claim 15 wherein said non-sequential access main memory comprises:
a scatter/gather memory module.

19. The system of claim 15 wherein said heterogeneous functional unit comprises a dynamically-reconfigurable instruction set.

20. The system of claim 15 wherein said heterogeneous functional unit comprises a field-programmable gate array (FPGA).

21. The system of claim 15 wherein said non-sequential access main memory enables access of individually-referenced physical addresses, rather than block-oriented accesses.

22. The system of claim 15 wherein said system enables full bandwidth memory access for non-sequential memory accesses.

23. A method comprising:
decoding, by a processor core of a system, an instruction of an executable file being executed, wherein the executable file includes native instructions that are recognized by a native instruction set of the processor core and extended instructions that are not recognized by the native instruction set of the processor core;
determining, by said processor core, whether the decoded instruction is one of said native instructions or is one of said extended instructions;
when determined that the decoded instruction is one of said native instructions, executing the decoded instruction by said processor core according to said processor core's native instruction set, wherein said processor core accesses data for executing said decoded instruction via a cache-access path in which block data is fetched from a non-sequential access main memory of the system for loading to a cache of said system; and
when determined that the decoded instruction is one of said extended instructions, sending the decoded instruction to a heterogeneous functional unit of the system, where the heterogeneous functional unit has an extended instruction set that recognizes said extended instruction, said heterogeneous functional unit being operable to execute the decoded extended instruction according to said extended instruction set, and wherein said heterogeneous functional unit accesses data for executing said decoded extended instruction via a direct-access path in which individually-addressed data is fetched from said non-sequential access main memory.

24. The method of claim 23 wherein said processor core, said cache, and said heterogeneous functional unit are included on a common die.

25. The method of claim 23 wherein said non-sequential access main memory enables retrieval of individually-referenced physical addresses, rather than block-oriented accesses.

26. The method of claim 23 wherein said non-sequential access main memory enables full bandwidth memory access for non-sequential memory accesses.

27. A system comprising:
a main memory subsystem comprising non-sequential access main memory;
a processing subsystem comprising:
  a microprocessor core having a first instruction set for executing a first portion of instructions included in an executable file,
  a communication bus via which the microprocessor core is operable to send a second portion of instructions having specific syntax as appearing in the executable file to a heterogeneous functional unit,
  the heterogeneous functional unit having a second instruction set for executing the second portion of instructions according to the specific syntax, and
  cache memory;
a cache-access path in which block data is fetched from said non-sequential access main memory for loading to said cache memory for processing of said first portion of instructions by said microprocessor core; and
a direct-access path in which individually-addressed data is fetched from said non-sequential access main memory for processing of said second portion of instructions by said heterogeneous functional unit.

28. The system of claim 27 wherein said non-sequential access main memory enables access of individually-referenced physical addresses, rather than block-oriented accesses.

29. The system of claim 27 wherein said heterogeneous functional unit is reconfigurable to have as said second instruction set any of a plurality of predefined extended instruction sets for extending the first instruction set such that each extended instruction set provides extended instructions not natively supported by the first instruction set.

30. The system of claim 29 wherein said microprocessor core, said heterogeneous functional unit, and said cache memory are included on a common die.

31. The system of claim 29 wherein said second instruction set extends the first instruction set by providing extended instructions not natively supported by the first instruction set of the microprocessor core.

32. The system of claim 29 wherein said heterogeneous functional unit is reconfigurable to have as said second instruction set any of a plurality of predefined extended instruction sets for extending the first instruction set such that each extended instruction set provides extended instructions not natively supported by the first instruction set.

33. The method of claim 23 wherein said decoding comprises converting the instruction into a machine-readable form.

34. The method of claim 33 wherein said machine-readable form comprises binary form.

35. The method of claim 23 wherein the heterogeneous functional unit receives and executes the decoded extended instruction, in a specific syntax as decoded by said decoding performed by said processor core.

36. The method of claim 35 wherein said decoded extended instruction is a machine-readable equivalent of said extended instruction appearing in the executable file.

37. A system comprising:
non-sequential access memory;
a processor having a first instruction set, said processor operable to execute a first portion of instructions included in an executable file that are defined by the first instruction set, where the executable file includes said first portion of instructions that are defined by the first instruction set and further includes a second portion of instructions that are not defined by the first instruction set;
a communication bus via which the processor sends the second portion of instructions included in the executable file to a heterogeneous co-processor;
the heterogeneous co-processor having an extended instruction set that defines said second portion of instructions, said heterogeneous co-processor operable to execute the second portion of instructions according to its extended instruction set;
cache memory;
a cache-access path in which block data is communicated between said non-sequential access memory and said cache memory for accesses of said block data by said processor for executing said first portion of instructions; and
a direct-access path in which individually-addressed data is communicated to/from said non-sequential access memory for accesses of said individually-addressed data by said heterogeneous co-processor for executing said second portion of instructions.

38. The system of claim 37 wherein in said cache-access path said block data is fetched from said non-sequential access memory for loading to said cache memory.

39. The system of claim 37 wherein in said cache-access path said block data is stored to said non-sequential access memory from said cache memory.

40. The system of claim 37 wherein in said direct-access path said individually-addressed data is fetched from said non-sequential access memory to said heterogeneous co-processor.

41. The system of claim 37 wherein in said direct-access path said individually-addressed data is stored to said non-sequential access memory from said heterogeneous co-processor.

42. The system of claim 37 comprising:
a die on which said processor, said heterogeneous co-processor, and said cache memory are included.

43. The system of claim 37 wherein said processor accesses data via said cache-access path; and wherein said heterogeneous co-processor is operable to access data via said direct-access path.

44. The system of claim 37 wherein said heterogeneous co-processor comprises dynamically-reconfigurable logic that is reconfigurable to have any of a plurality of different extended instruction sets.

45. The system of claim 44 wherein said dynamically-reconfigurable logic comprises a field-programmable gate array (FPGA).

46. The system of claim 37 wherein said non-sequential access memory comprises:
a scatter/gather memory module.

47. The system of claim 37 wherein said non-sequential access memory enables access of individually-referenced physical addresses, rather than block-oriented accesses.

48. A method comprising:
decoding, by a processor core of a system, an instruction of an executable file being executed, wherein the processor core has a first instruction set, and wherein the executable file includes first portion of instructions that are defined by the first instruction set of the processor core and further includes a second portion of instructions that are not defined by the first instruction set of the processor core;
determining, by said processor core, whether the decoded instruction is of a first class or a second class, where an instruction defined by the first instruction set of the processor core is of said first class and an instruction that is not defined by the first instruction set of the processor core is of said second class;
when determined that the decoded instruction is of said first class, executing the decoded instruction by said processor core according to said first instruction set, wherein said processor core accesses data for executing said decoded instruction via a cache-access path in which block data is fetched from a non-sequential access main memory of the system for loading to a cache of said system; and
when determined that the decoded instruction is of said second class, sending the decoded instruction to a heterogeneous co-processor of the system, where the heterogeneous co-processor has an extended instruction set that defines said instruction of said second class, said heterogeneous co-processor being operable to execute the instruction of said second class according to said extended instruction set, and wherein said heterogeneous co-processor accesses data for executing said decoded instruction via a direct-access path in which individually-addressed data is fetched from said non-sequential access main memory.

49. The method of claim 48 wherein said processor core, said cache, and said heterogeneous co-processor are included on a common die.

50. The method of claim 48 wherein said non-sequential access main memory enables retrieval of individually-referenced physical addresses, rather than block-oriented accesses.

51. The system of claim 15 wherein said micro-processor core comprises a first instruction set that defines instructions that are executable by said micro-processor core, wherein said heterogeneous functional unit comprises a second instruction set that defines instructions that are executable by said heterogeneous functional unit, and wherein said instructions defined in said first instruction set are not executable by said heterogeneous functional unit, and said instructions defined in said second instruction set are not executable by said micro-processor core.

52. The method of claim 23 wherein said native instructions are not recognized by said extended instruction set of said heterogeneous functional unit.

53. The system of claim 27 wherein each instruction in said first instruction set is not executable by said heterogeneous functional unit, and each instruction in said second instruction set is not executable by said microprocessor core.

54. The system of claim 37 wherein said first portion of instructions are not defined by the extended instruction set of said heterogeneous co-processor.

55. The method of claim 48 wherein a decoded instruction of said first class is not defined by said extended instruction set of said heterogeneous co-processor.

* * * * *